May 17, 1932. L. BIRD 1,858,948
COMBINED GROUND WORKING AND PULVERIZING MACHINE
Original Filed June 21, 1927 4 Sheets-Sheet 1

Inventor
LEE BIRD.
By Walter W Burns.
Attorney

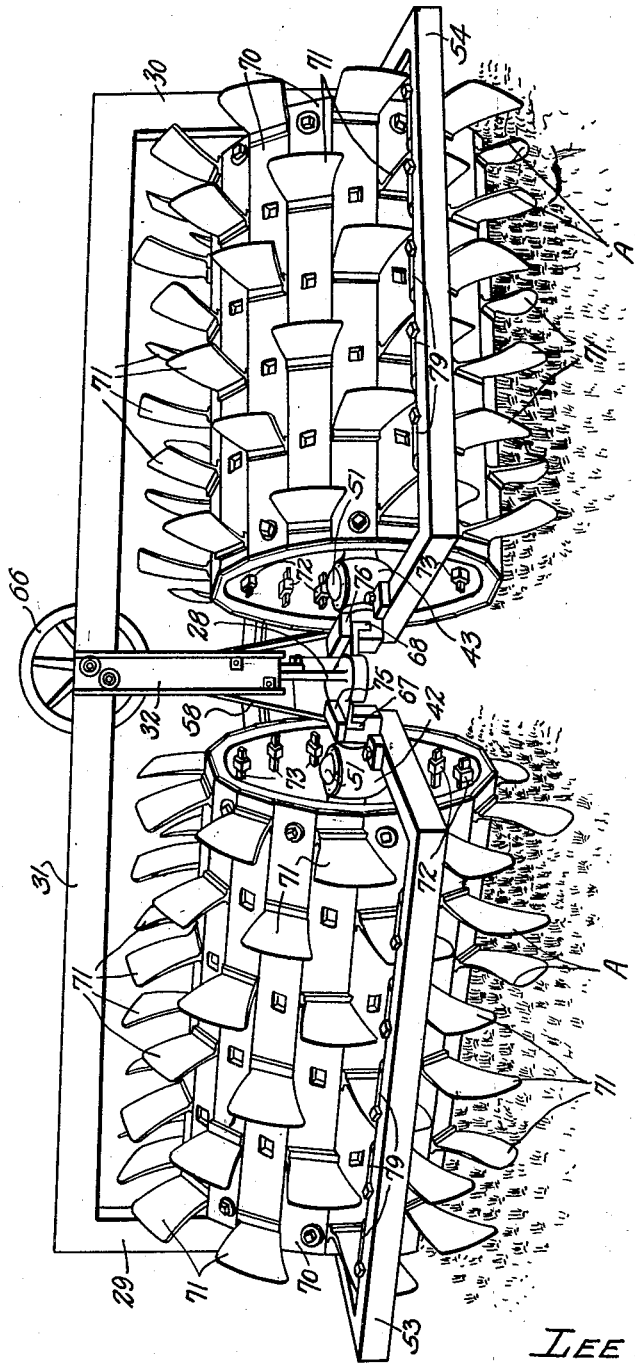

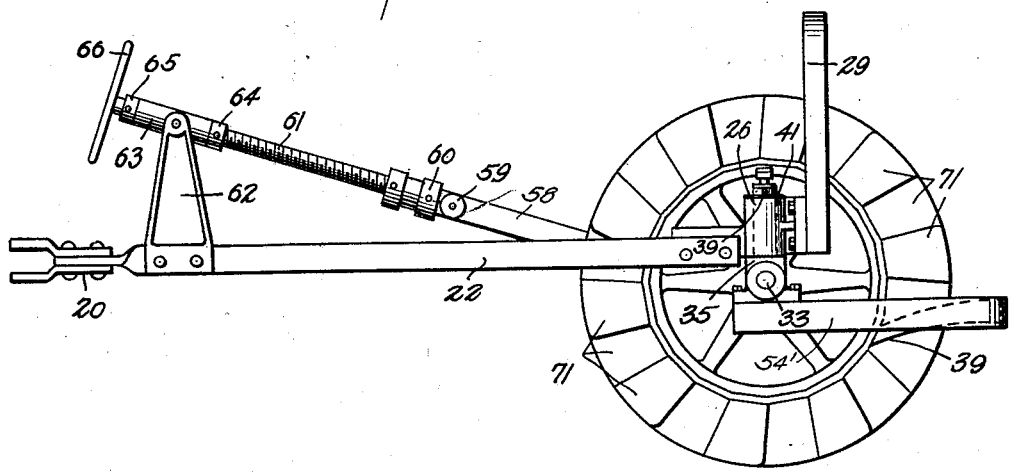
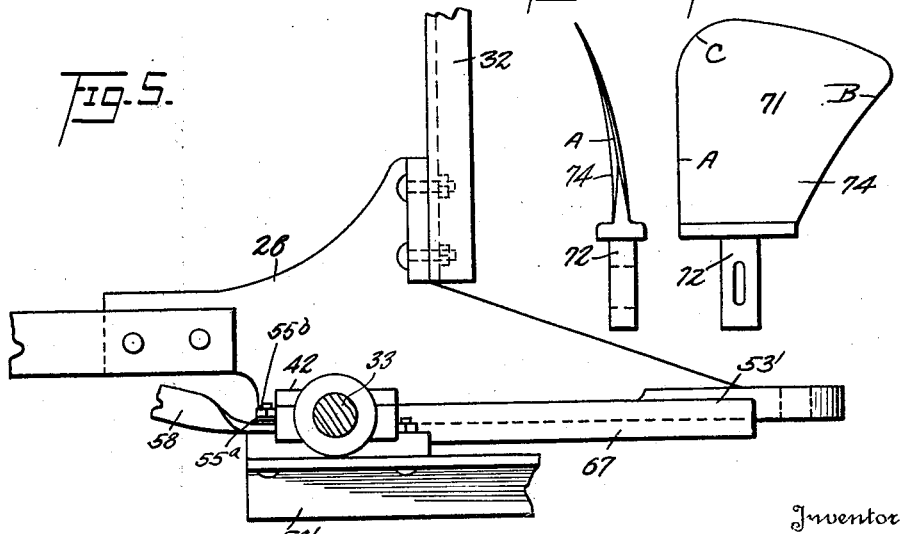

May 17, 1932. L. BIRD 1,858,948
COMBINED GROUND WORKING AND PULVERIZING MACHINE
Original Filed June 21, 1927 4 Sheets-Sheet 4
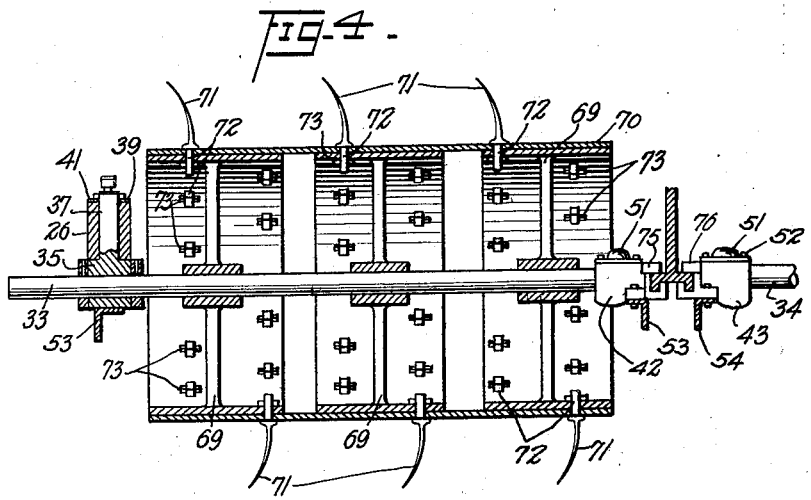
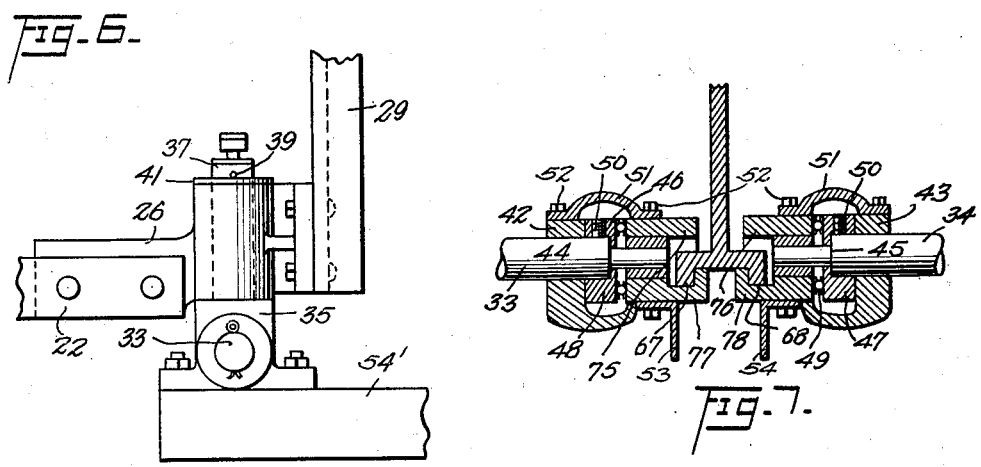
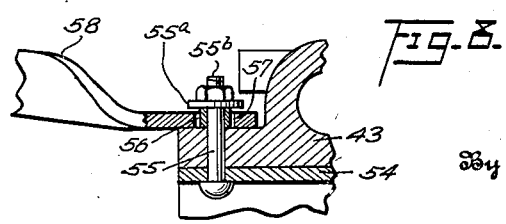
Inventor
LEE BIRD
By Walter W. Burns
Attorney Patented May 17, 1932

1,858,948

UNITED STATES PATENT OFFICE

LEE BIRD, OF ROCK SPRING, GEORGIA

COMBINED GROUND WORKING AND PULVERIZING MACHINE

Original application filed June 21, 1927, Serial No. 200,490. Divided and this application filed July 31, 1928. Serial No. 296,459.

This invention relates to combined spaders and pulverizers and is a division of my application, Serial Number 200,490, filed June 21, 1927, Patent Number 1,681,835, patented Aug. 21, 1928.

At the present time, it is common practice to first go over a field several times with some sort of harrow to break up the lumps to render the soil fit for planting. I have found that even after this treatment, the soil in some parts of the country will still not be finely pulverized.

In one type of ground working implements, it is customary to have a plurality of cylindrical ground contacting elements under control of a single draft means and connected to a single frame. Difficulty has sometimes been experienced in keeping uniform pressure upon the ground throughout the length of the implement and in keeping the elements properly aligned.

The primary object of the present invention is the provision of a frame for a device which will at the same time spade the earth and break up the lumps, thereby saving time in going over the field many times.

A still further object of my invention is the provision of a frame for a ground working implement having drums for carrying ground engaging tools, a frame for the machine, means for angling the drums and means for guiding the drums including an arcuate guide means.

A still further object of my invention is the provision of a frame for a ground working implement having rotating angling drums carrying earth engaging elements, the drums having separate mountings for the bearings for the rotary movement and the angling movement.

A still further object of my invention is the provision of a frame for a ground working implement having a pair of angling drums and means for angling the drums and for, at the same time, maintaining the axes of the drums in substantially the same horizontal plane.

A still further object of my invention is the provision of a frame for a ground working implement having a pair of angling drums, means for angling the drums and for pivoting the axes of the drum in opposite directions and for guiding the movable ends in substantially a horizontal plane along an arcuate path, and means for connection with arcuate path for absorbing the thrust antifrictionally.

Referring to the drawings, Fig. 1 is a plan view of my invention showing the drums in transport or road position.

Fig. 2 is a rear view of the same.

Fig. 3 is a side view.

Fig. 4 is a sectional view on the line 4—4 of Fig. 1.

Fig. 5 is a detail view of the drum guide and position retaining member.

Figs. 6, 7 and 8 are detail views of parts of the construction.

Figs. 9 and 10 are enlarged detail views of the soil working elements.

Like reference characters refer to the same or similar parts throughout the several views of the drawings.

Figure 1:
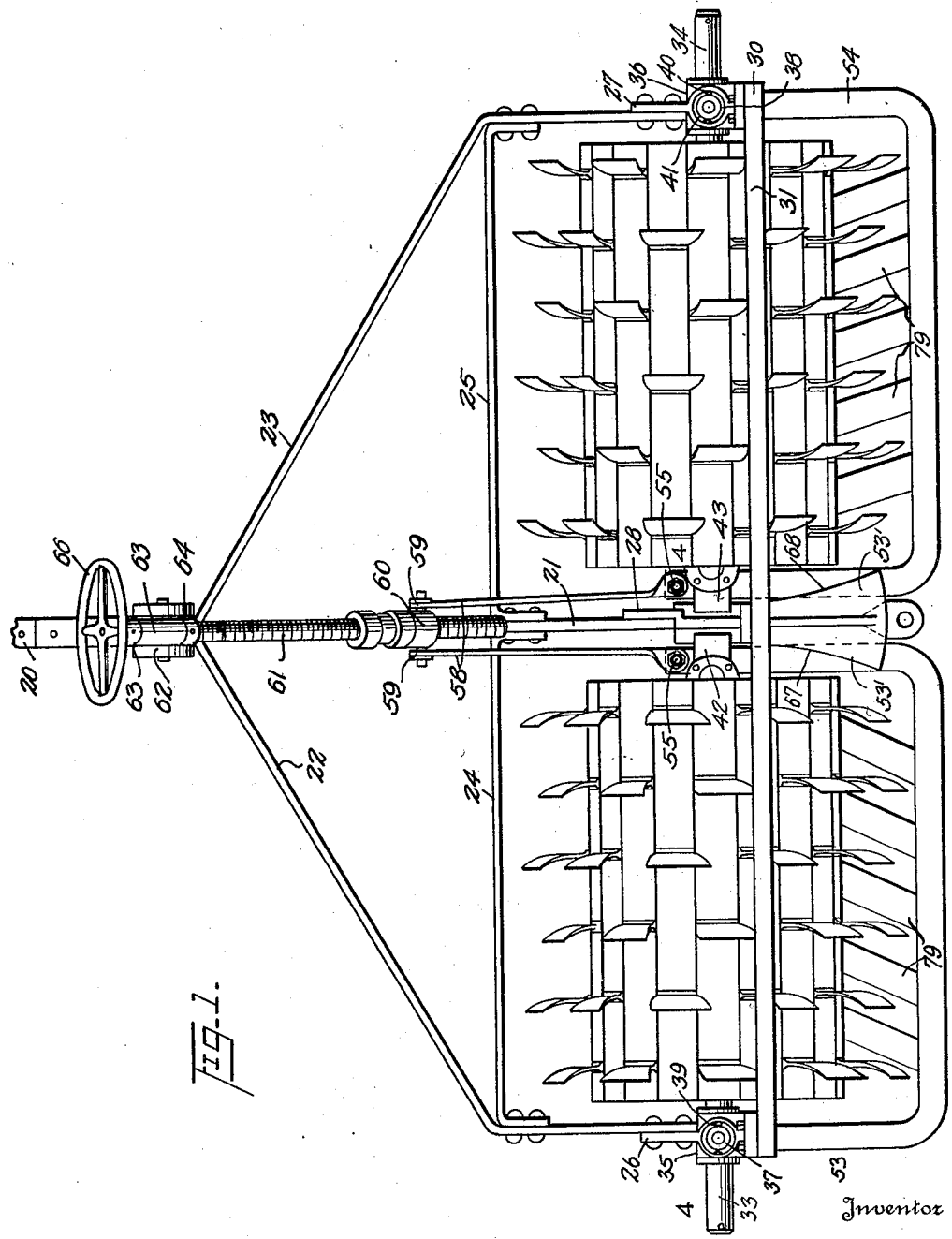

The numeral 20 designates the draft device of the implement which is attached at the forward end of the frame. The frame comprises a centrally extending member 21 and two laterally extending members 22 and 23. Between the members 21 and 22 and between the members 21 and 23 are two brace members 24 and 25 respectively. The outer portions of the side members 22 and 23 are bent inwardly at a position parallel to each other and are attached respectively to the bearing members 26 and 27 which form portions of the mountings for the outer ends of the drums to be described.

The rear portion of the frame member 21 is secured to a member 28, presently to be described; this member being shown in Fig. 5. Secured to the bearing members 26 and 27 are upright portions 29 and 30 of a frame 31. At the center of the frame 31 is the vertical frame portion 32 which connects to the member 28 to be described.

As above described the members 21, 22, 23, 24, 25, 26, 27, 28, 29, 30, 31, and 32 form a rigid frame for holding in position the drums with their ground engaging members to be described.

The drums are supported upon shafts 33 and 34. These shafts rotate respectively in outer bearing members 35 and 36. The bearing members 35 and 36 are provided with integral upwardly extending stub shafts or spindles 37 and 38. These stub shafts 37 and 38 are provided with openings transverse of their axes for the reception of cotter pins 39 and 40. As shown in Fig. 3, a washer 41 may be provided between the cotter pin and the bearing members 26 and 27.

The members 26, 27, 35, 36, 37, 38, form together the mountings for the outer ends of the drums to be described.

It will be noted that the upright spindles or stub shafts 37 and 38 are vertical and thus permit of the swinging of the shafts 33 and 34 about the axes of the spindles 37 and 38 respectively.

The inner ends of the drum shafts are mounted in special mountings which I have designated generally by the numerals 42 and 43. The mountings are provided with bearings for the ends of the shafts 33 and 34 respectively and are provided with bearings for co-action with the sides of the member 28 to prevent endwise movement of the shafts 33 and 34 inwardly.

Each shaft 33, 34 is provided with two bearing surfaces in the respective mountings 42 and 43. Shoulders 44 and 45 are provided on the shafts 33 and 34 respectively. These shoulders 44 and 45 engage corresponding surfaces of thrust bushings 46 and 47 of the respective mounting members 42 and 43 and there are provided ball thrust or other suitable bearing members which provide for the easy operation of the shafts 33, 34 when the latter are under pressure to be forced inwardly as when the device is in operation with drums angled. The members 42 and 43 are constructed in the shape of housings.

These housings 42 and 43 entirely inclose the thrust bushings 46 and 47 and the thrust bearings 48 and 49 respectively. The thrust bushings 46 and 47 are provided with suitable set screws as at 50. These hold the bushings in place with relation to the shafts 33 and 34. The openings for the thrust bushings 46 and 47 and the thrust bearings 48 and 49 are just sufficient to permit free movement of the bushings and bearings without binding action.

In assembling the parts at this point, the thrust bushings 46 and 47 are placed in the housings respectively and the shafts 33 and 34 are inserted and passed through the bushings and the bearings. The set screws, as for example set screw 50, are then tightened and no axial movement between the shaft and its bearing and the thrust bearings will be possible. In order to close the opening at the top of the housing and through which the thrust bushings 46 and 47 and the bearings 48 and 49 were inserted, I provide a housing cover which I have designated on Fig. 7 as at 51.

These covers 51 completely close the openings in the housings 42 and 43 and provide for the reception of oil or other lubricant and to prevent the admission of dirt or other foreign matter. These housing covers 51 are provided with holes through which may be inserted bolts 52 to hold the housing covers in proper position.

The member 28 is provided with arcuate portions 53 which are arranged at opposite sides and which constitute guide members for the mountings 42 and 43. These arcuate portions each have a curved edge which is a part of a circle whose radius is equal to the distance from the guide to the axes of the mounting of the bearing members 35 and 36. Connecting the mountings 42 and 43 respectively, with the mountings 35 and 36 are U-shaped members 53 and 54. The bearing member 35, the U-shaped member 53, and the mounting 42 form the pivoted frame of one drum while the bearing member 36, the U-shaped member 54, and the mounting 43 constitute the frame of the other drum.

In the construction illustrated in the accompanying drawings, I have shown a means for angling the drums simultaneously. This device is shown in Figs. 1, 3 and 8. At the forward end of the mountings 42 and 43, I have placed a bolt, illustrated particularly in Fig. 8. This bolt 55 passes through the mounting 43 and also passes through a bushing 56 which contacts with an opening 57 in a flat operating rod 58 at its rear end. The forward ends of the rods 58 are secured at 59 to a long nut 60 which is threaded on the threaded shaft 61.

At the forward end of the frame members 22 and 23 is mounted a support 62 at the upper end of which is pivoted a sleeve 63 to oscillate in a vertical plane. This sleeve 63 is provided with an opening of a size to receive the shaft 61 which is journaled therein. Collars 64 and 65 are pinned to the shaft 61 on opposite sides of the sleeve 63 to prevent endwise movement of the shaft 61 due to thrust forces. A hand wheel 66 is provided on the end of the shaft 61 to turn the same to operate the long nut 60 which is threaded at the lower end of the shaft 61. It is understood that the bolt 55 is provided with the washer 55ª and the nut 55ᵇ to retain the bushing 56 in its proper place.

When transporting this implement from one place to another it is to be understood that the axes of the drums will be in a common line and in this position the implement will roll over the ground without having the ground working elements enter to a very great extent. When it is desired to place the drums in working position it is only necessary to turn the wheel 66 so as to bring a compression in the bars 58. This will force the inner ends of the drums to the rearward and the device is ready for operation. If desired, the implement may be pulled forwardly which will greatly lessen the manual labor necessary to turn the wheel 66. When the wheel 66 is turned to angle the drums, a thrust is created in the bars 58. This causes the inner ends of the drums to move to the rear, the mountings 43 and 44 moving along the arcuate edges 67 and 68 of the member 28. These arcuate edges 67 and 68 are formed having the shape of a portion of a circle having a radius equal to the distance between these arcuate edges and the respective centers of the spindles 37 and 38.

When it is desired to bring the drums from working position to transport position as shown in Fig. 1, it is only necessary to turn the hand wheel 66 in the opposite direction. This results in placing the bars 58 under tension and draws the mountings 43 and 44 forwardly to bring the axes of the drums in a common line.

The construction of the drums themselves is shown very well in Fig. 4. In the construction illustrated, there are three wheels which are identical and which I have designated as 69. These wheels are each provided with twenty flat spaces, equally distributed about their periphery. These wheels when mounted upon their respective shafts form the support for a continuous series of slats or bars 70. There is one slat or bar 70 for contact with each flat space about the circumference of the wheels 69. The bars 70 are each provided with six openings to register with corresponding openings in the wheels 69.

The ground engaging devices 71 are provided with shanks 72 which shanks are in turn provided with openings therethrough for the admission of suitable wedges 73. The shanks 72 are put through the openings in the bar 70 and the wheel 69, and when the wedges 73 are in place, the whole structure is rigid.

In operation, I have found that the utilization of three of these openings in each bar 70 for the attachment of the soil engaging elements 31 is sufficient to perform the desired function of the machine. I find that by arranging the soil working elements 71 of one row so that the adjacent rows, in each case, will be in echelon, the best results are obtained.

When the soil working elements 71 are arranged in this way, it will be seen that with the drums angled, a spiral effect is obtained so that the soil working elements engage the ground almost in a straight line, due to the spiral arrangement. The exact desired order of sequence in ground engagement can be controlled by the degree of angling as I have described for the operation of the hand wheel 66.

I have found, in practice, that this alternate arrangement is very efficient, particularly with the soil working element of the shape to be presently described.

In Figs. 9 and 10, I have illustrated the particular shape of the soil working element. On Fig. 9, the flat portion 74 is sharpened from about the point A on the forward edge outwardly and along the outer edge to the point B. In addition to this, the meeting point C of the outer edge of the soil working element 71 is rounded. This has been found to be an important feature in that this sharp edge facilitates the cutting of the ground as the soil working element enters and as it leaves the surface of the ground near the end of the outward movement. This shape of blade permits the leaving of the surface of the ground without throwing up lumps.

Assuming the drums to be angled, it will be observed that the soil working elements 71 are in such a position that they will point substantially in the direction of the line of travel of the implement. As the rotation progresses, the sharp edge A—C will enter the ground, followed by the whole body of the soil working element 71. This action displaces very little of the soil. During the outward movement, the action is quite different. The angular position of the soil element is now accentuated and the forward movement of the drum in its angled position causes a sidewise movement of the soil held by the particular soil working element 71. As the soil working element 71 begins to leave the surface of the ground, the sharp forward edge A—C—B permits the same to easily leave.

The rearward point B continually moving to the side at an increasingly greater speed. The result of this action has been found in actual practice to be that the ground is thoroughly shattered without turning the same upside down as is done in the case of a plow of the ordinary type. It has been found that soil which was baked hard in the sun could be thoroughly broken up so that there would be no lumps while at the same time the undesirable action of turning the soil was avoided. The effect produced was similar to the effect which is produced when soil is dynamited for the planting of trees.

The result is that the soil is given additional water holding qualities, the nitrogen collecting properties of the soil are not disturbed, and in one operation instead of two or more, the soil is ready for planting.

The operation of the device is somewhat similar to the shattering effect when a slice of soil is spaded with a hand spade and then the spade forcibly drawn across the slice while at the same time greater pressure is used with the point than with the upper part of the spade.

During adjustment of the drums forwardly and rearwardly, as above described, and during the travel over undulating ground; it is necessary to have means to prevent the inner ends of the drums from moving upwardly or downwardly due to a difference in level of the ground. To meet this condition, I have provided a pad member 75 on the mounting 42 and a similar pad 76 on the mounting 43. These pads 75, 76 rest upon the tops, respectively of the arcuate portions 67 and 68 of the member 28. To prevent upward movement of the mountings 42 and 43, I provide extensions from the mountings 42 and 43 which I have designated 77 and 78. These extensions extend under the arcuate portions 67 and 68 in such a way that a portion of the arcuate portion 67 and 68 overlaps and has a lock engagement with the portions 77 and 78 of the mounting 42 and 43 respectively.

This is clearly shown on Fig. 7. It is also shown clearly in this view, that the mountings 42 and 43 are in contact with the outer surfaces of the arcuate portions 67 and 68. From this description it is clear that the mountings 42 and 43 may swing with the axles 33 and 34 respectively in an arc about the extensions 37 and 38, but the mountings cannot move in any direction except along the arcuate members 67, 68. In this manner the shafts are always kept in the plane which is determined by the arcuate members 67, 68 and the members 35 and 36 which carry the shafts 33 and 34. Any tendency of the drums to move the shafts 33 and 34 out of this relation will simply bring pressure on the member 32 and the frame 31 without causing any movement as a result of this pressure.

In order to provide a combined cleaning and cutting device for cutting up clods, corn stalks, or other large pieces which may be met in the field, I have provided angularly positioned channeled members 79. The channel bars 79 are secured to the U-shaped members 63 in any suitable manner as by riveting or welding. The forward ends of the channel members 79 are of such a shape that the clods, corn stalks, etc. which are brought out of the ground, will be cut between the blades 71 and the channel members 79. These channel members 79 are so placed at an angle that they will follow the curvature of the ground engaging members 71 and will come close to, but not in touch with the bars 70 of the drums.

When the clods, corn stalks, etc. are picked up by the ground engaging devices 71, they will be drawn or broken in pieces between the ground engaging members 71 and the channel members 79.

Inspection of Figs. 1, 2 and 3 will clearly show the feature of maintaining the axes of the drums in a substantially horizontal plane regardless of the adjustment. Since the arcuate portions 53′ are in a horizontal plane, the adjustment of the drums to angular position will move the inner ends of the shafts to the rear. But since these inner ends are constrained to move along the surfaces 67 and 68, the shafts 33 and 34 will still be in a substantially horizontal plane. It is to be noted that the part 32 of the frame which supports the arcuate portions 53′, maintains its position relative to the parts 29 and 30 of the frame. This insures the holding of the drum axes in proper relation and prevents undulating ground from causing the tipping of the drums. It will be seen that were it not for the frame part 32 and its cooperating parts, the weight of the frame would cause greater weight at the outer ends of the drum than at the inner ends. This would cause a non-uniform action of the ground working devices.

While I have shown and described, in detail, an embodiment of my invention, I desire to have it understood that modifications and changes may be made without departing from the spirit of my invention and within the scope of the appended claims and that I do not limit myself to the exact showing.

Having described my invention what I claim and desire to secure by Letters Patent is:—

1. A ground working implement having a plurality of drums arranged in an end to end relation and carrying ground engaging devices, a single means for simultaneously angling the drums relative to the line of travel and means for holding the drums so that their axes will remain in the same plane, when in operation, regardless of the angle of adjustment and so that their axes will intersect at a point between the two drums.

2. A ground working implement having a frame, drums arranged in an end to end relation and carrying ground engaging devices, a single means for simultaneously angling the drums relative to the line of travel to predetermined positions, means for guiding one end of each drum during the angling operation along arcuate paths and for holding the drum axes in their predetermined positions when passing over undulating ground the drums being so mounted that when placed in angled position, the drum axes will intersect at a point between the two drums.

3. A ground working implement having a frame, a pair of drums arranged in an end to end relation and carrying ground engaging devices, a single means for simultaneously angling the drums relative to the line of draft and to each other, to predetermined positions, means for guiding one end of each drum during angling along arcuate paths and for holding the drum axes in their predetermined positions when passing over undulating ground the drums being so mounted that when placed in angled position, the drum axes will intersect at a point between the two drums.

4. A ground working implement having a frame, a pair of drums arranged in an end to end relation and carrying ground engaging devices, a single means for simultaneously angling the drums relative to the line of draft and to each other, to predetermined positions, means for guiding the swinging ends of the drums during angling along arcuate paths and for holding the drum axes in their predetermined positions when passing over undulating ground the drums being so mounted that when placed in angled position, the drum axes will intersect at a point between the two drums.

5. A ground working implement having a frame, a pair of drums arranged in an end to end relation and carrying ground engaging devices, a pivotal supporting means for one end of each of the drums, a single means for simultaneously angling the drums relative to the line of draft and to each other to predetermined positions, means for guiding the swinging ends of the drums, during angling, along arcuate paths and for holding the drum axes in their predetermined positions when passing over undulating ground the drums being so mounted that when placed in angled position, the drum axes will intersect at a point between the two drums.

6. A ground working implement having a frame, a pair of drums arranged in an end to end relation and carrying ground engaging devices, a supporting shaft, for each drum, the shafts mounted to swing at their outer ends about axes 90° from the shaft axes, means for simultaneously guiding the inner ends of the shafts in substantially the same horizontal plane during swinging and for holding the shaft in adjusted position when passing over undulating ground the drums being so mounted that when placed in angled position, the drum axes will intersect at a point between the two drums.

7. A ground working implement having a frame, a pair of drums arranged in an end to end relation and carrying ground engaging devices, a supporting shaft for each drum, the shafts mounted to swing at their outer ends about axes 90° from the shaft axes, means for simultaneously guiding the inner ends of the shafts in substantially the same horizontal plane during swinging to angled position and for holding the shaft in adjusted position when passing over undulating ground the drums being so mounted that when swung to angled position, the axes will intersect at a point between the drums and means for absorbing the thrust of the drums when angled while still permitting free rotation of the drums.

8. A ground working implement having a frame, a pair of drums carrying ground engaging devices, a supporting shaft for each drum, the shafts pivotally mounted at their outer ends to swing to angular positions about axes 90° from the shaft axes, bearing members at the pivot points, the frame comprising an overhead frame member connected at its outer ends to the bearing members, means supported from the middle of the overhead member for guiding the inner ends of the shafts in substantially the same horizontal plane during the swinging to an angular position and for holding the shaft in adjusted position when passing over undulating ground.

9. A ground working implement having a frame, a pair of drums carrying ground engaging devices, a supporting shaft for each drum, the shafts pivotally mounted at their outer ends to swing to angular positions about axes 90° from the shaft axes, bearing members at the pivot points, the frame comprising an overhead frame member connected at its outer ends to the bearing members, means supported from the middle of the overhead member for guiding the inner ends of the shafts in substantially the same horizontal plane during the swinging to an angular position and for holding the shaft in adjusted position when passing over undulating ground and thrust bearing means for absorbing the thrust of the drums when angled while still permitting free rotation of the drums.

10. A ground working implement having a main frame, a pair of drum frames, vertical pivot connections between the main frame and the drum frames, the drum frames having journal bearings at one end adjacent the pivot end and another adjacent the swinging end, a drum on each frame and mounted for pivotal support in the journal bearings; each drum frame comprising a U-shaped member extending around the side of the drum and a mounting at the swinging end of each drum and means for confining the movement of the mountings substantially to a plane.

11. A ground working implement having a frame, a pair of drums carrying ground engaging devices and mounted end to end, a supporting shaft for each drum, the shafts mounted to swing at their outer ends about axes 90° from the shaft axes, means for guiding the inner ends of the shafts in substantially the same horizontal plane during swinging and for holding the shaft in adjusted position when passing over undulating ground the drums being so mounted that when swung to angled position, the axes will intersect at a point between the drums, said means including a member having two arcuate guides having edges forming parts of circles having centers at the pivots of these respective drums.

12. In a ground working implement of the type having a pair of angling drums carrying soil working members, a frame, means for supporting the movable ends of the drums comprising a member provided with two arcuate edges for constraining the movement of the movable ends of the drums to a substantially horizontal plane.

In testimony whereof I hereunto affix my signature.

LEE BIRD.